Feb. 24, 1931.  W. P. KELLETT  1,793,806
FREIGHT HANDLING TRUCK
Filed July 26, 1929   2 Sheets-Sheet 2

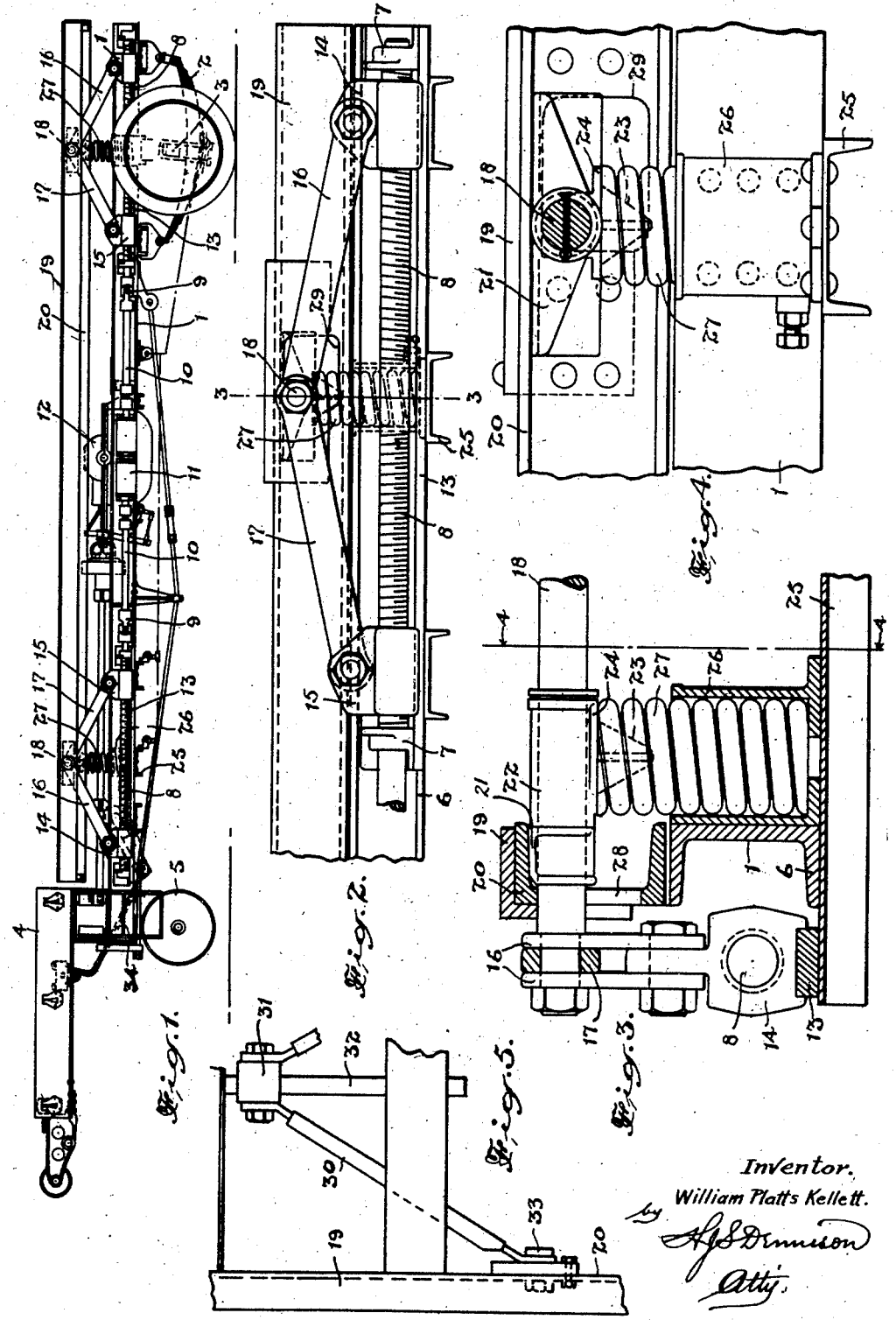

Inventor
William Platts Kellett

Patented Feb. 24, 1931

1,793,806

UNITED STATES PATENT OFFICE

WILLIAM PLATTS KELLETT, OF NEW YORK, N. Y.

FREIGHT-HANDLING TRUCK

Application filed July 26, 1929. Serial No. 381,337.

The principal object of this invention is to provide in a truck or trailer having an adjustable platform superstructure a means for assisting the initial movement of the mechanical means in overcoming the inertia of the load in the raising of the platform.

A further and important object of the present invention is to provide means for effectively stabilizing the movement of the platform in the raising and lowering of same and generally to facilitate the transfer of "roll off" freight containers between highway trucks and railroad cars or loading platforms.

The principal feature of the present invention consists in providing in a truck or trailer having a movable platform, spring means capable of lifting the load supported by the platform during the initial movement of the mechanical means for raising the platform from its substructure.

A further and important feature consists in the novel construction and arrangement of parts whereby the load elevating members are supported.

In the drawings, Figure 1 is a side elevational view of a trailer to which my invention is applied showing a platform in a slightly elevated position.

Figure 2 is an enlarged side elevational detail showing the platform raising mechanism in its lowermost position.

Figure 3 is an enlarged sectional detail through the line 3—3 of Figure 2.

Figure 4 is an elevational view of the structure illustrated in Figure 3 as seen from the inner side on the line 4—4 of Figure 3.

Figure 5 is a plan view of the angle bracing supports.

Figure 6:
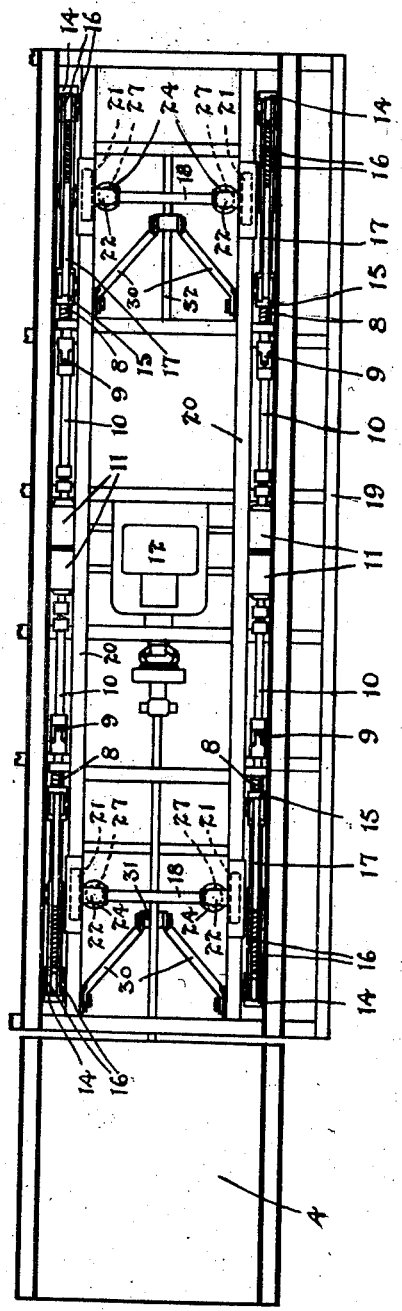
Figure 6 is a plan view illustrating the general arrangement of the operating members for raising and lowering the platform.

The present invention relates to the development of a truck structure as fully described in my previous United States patent application, Serial Number 337,414 filed February 4th, 1929, in which the frame superposed upon a rigid frame is raised and lowered at either end particularly for the purpose of facilitating the handling of freight containers.

Such truck structure is, however, of great utility in the general business of trucking as the height of the platform may be varied, either with or without a full load to correspond with loading platforms in a wide range of heights and the tilting capability of the platform of the truck will enable the loading and unloading of heavy loads with great ease.

The invention is herein shown applied to the drop frame type of trailer which has a very low sub-structure in the form of a frame 1 supported on the underslung springs 2 carried by the rear axle 3.

The forward end of the frame is provided with an offset platform 4 adapted to rest upon the fifth wheel structure 5 of a suitable tractor.

At each end of the frame 1 and on the outer side thereof there are secured to the channel side bars 6 the bearing brackets 7 arranged in pairs and in each pair of brackets arranged longitudinally of the frame is journalled the right and left hand threaded shafts 8.

The shafts on either side of the frame are connected through universal couplings 9 and shafts 10 to gear connections arranged in the gear box 11 and the shafts are driven through a suitable gear arrangement in the gear case 12 so that they operate in pairs, the front pair operating together in either one direction or the other and the rear pair operating together.

Longitudinal guides 13 are supported on the frame beneath the threaded shafts 8 and on these guides are slidably mounted the cross heads 14 and 15 which are threaded on to the oppositely threaded ends of each of the shafts 8.

A pair of links 16 are pivotally connected to a cross head 14 and a single link 17 of equal cross section to the pair of links 16 is connected to each of the cross heads 15.

The links 16 and 17 extend toward each other in an angular direction and are pivotally mounted on the end of a bar 18 which extends across and supports the upper frame or platform 19.

The platform 19 is formed with channel sides 20 and a block 21, preferably of cast metal mounted on each end of the cross bar fits within the channel sides of the platform frame and supports the channel.

Each block 21 is provided with a sleeve portion 22 extending inwardly and upon the underside of which is formed a cross V-shaped projection 23 provided with a flange 24.

Secured to the frame of the platform 19 on one of the cross bars 25 thereof and axially aligned with each of the V-shaped projections on the sleeve 22 is a cylindrical receptacle 26 in which is arranged a heavy coil compression spring 27. These springs when extended project a considerable distance above the top of the subframe 1 and engage the flanges 24 surrounding the V projections 23 of the sleeves 22.

The length of these springs is such as to engage the flanges 24 when the links 16 and 17 are in an intermediate position and the cross heads 14 and 15 have not travelled to their outward limit of movement and through the outward movement of the cross heads the springs are compressed by the further downward movement of the platform 19.

This provision forms the essential part of the present invention, in that the springs, which are capable of supporting a maximum load to be placed upon the platform 19, are compressed by the mechanical operation of the cross heads and toggle links and when released operate to lift the load until the central pivot point of the links on the cross bar 18 has been raised a substantial distance above the horizontal line between their pivotal connections to the cross heads.

The height of lift of the springs is proportioned in relation to the mechanical lifting mechanism so that the links will operate to continue the upward movement of the platform 19 under maximum load without undue stress upon the links or upon the operating screw shafts.

It will be noted that the side channels 20 of the side platform 19 are provided with vertical slots 28 at the forward end of the truck which permit the cross bar 18 to move downwardly, even after the channels 20 of the platform 19 have been brought into contact with the upper surface of the side channel members 6 of the frame 1, thus allowing latitude of movement of the cross heads beyond the settling point of the upper frame or platform.

At the opposite end of the platform 19 the web of the side channels is provided with a substantially rectangular opening 29 to permit a similar movement of the cross bar 18.

The tilting of the platform 19 to either one end or the other causes a difference of measurement between the cross bars in their varying positions, hence the requirement for a recess such as the openings 29 is necessary.

The structure is provided at either end with brace members 30 which are pivotally mounted at their lower ends upon the blocks 31 which blocks are rotatable and slidable on the longitudinally arranged bars 32 rigidly secured to the sub-frame 1 centrally thereof and adjacent to the ends.

The brace members 30 extend angularly outward and are pivotally secured by the pins 33 to the inner sides of the side channel 20 on the platform 19. This angular bracing supports the platform from lateral movement in its various elevated positions and the sliding movements of the blocks 31 permit perfect freedom for the necessary end play required by the tilting of the platform.

In the operation of the device, power is applied in a manner not herein shown or described to the central gear case 12 and suitable control devices are arranged to enable the operation of the shafts 10 and the threaded shafts 8 connected thereto individually in fore and aft pairs, that is to say, the threaded shafts 8 at the forward end may be operated to either raise or lower the forward end of the platform 19 independent of the movement of the rear end and likewise the rear end may be operated independent of the forward end.

It will thus be seen that the platform may be raised by operating all shafts together maintaining said platform in a level position to elevate it to any desired height within the limits of the mechanism provided, and conversely it may be lowered and in accordance with the requirements of use the front end may be tilted either upward or downward from the rear end.

This arrangement is so flexible that it enables the loading or unloading of the truck from any track level and in loading enables the front end to be tilted downwardly to any desired degree to facilitate the moving of heavy loads thereon with the least possible labor, also it enables the unloading of loads therefrom by tilting the rear end downwardly and it also enables the operation of the platform to move it to a level with the fixed front platform 4 so that any load carried thereon may be moved forward parallelly on to the forward fixed platform to allow access around either the forward section or rear section of a load.

Figure 7:
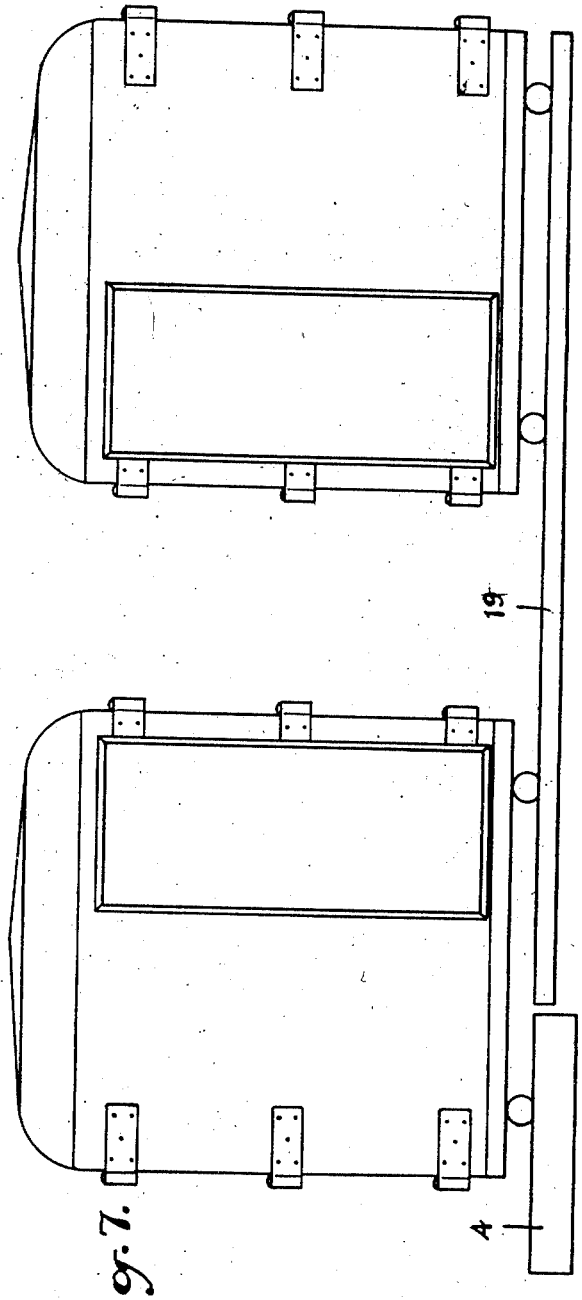
Figure 7 is a diagrammatic elevational view showing a pair of goods containers arranged on the truck platforms.

This is particularly applicable where freight containers are to be used. The upper platforms are provided with trackways and where end opening containers are being handled the containers may be moved apart by utilizing the forward platform to enable the end doors of the containers to be swung open. Figure 7 illustrates this feature.

It is not intended that the load should be carried in transit on the equipment described in the elevated position but that the upper platform shall be lowered to rest upon the subframe 1.

It will be understood that when the platform is in the lower position the toggle links 16 and 17 will be extended to an almost horizontal position, consequently their lifting power will be very much less than when the platform is raised and the compression springs 27 are provided to assist the lifting of the load while the toggles are in this position.

As has been described the members 23 and 24 engage the upper ends of the springs in a downward movement of the platform 19 prior to the platform reaching the downward limit of its movement and the toggle links apply the necessary force to pull the load downwardly against these springs as the springs are of sufficient strength to sustain the load when raised.

When it is desired to raise the load the threaded shafts are operated and they merely release the upward pressure of the springs until said springs reach their upward limit. The links will then be in a more advantageous position to exert an upward thrust.

The offset forward end of the sub-frame shown is very useful for certain classes of work and if it is desirable to provide means for ready access to the forward platform, a ladder structure 34 is provided extended downwardly from the forward platform adjacent to its rear end.

A means for transporting heavy loads such as described is extremely flexible enabling its use under practically all conditions of service. The device is shown as applied to a trailer but it will be readily understood that it can with equal facility be applied directly to a motor truck.

What I claim as my invention is:—

1. In a truck, the combination with a rigid frame, a superposed frame and means for raising and lowering said superposed frame, of spring means capable of raising the superposed frame and its load during the initial movement of the aforesaid raising means.

2. In a truck, the combination with a rigid frame, a superposed frame and means for raising and lowering said superposed frame, of means adapted to be depressed in the lowering of the superposed frame capable of raising said frame and its maximum load on being released.

3. In a truck, the combination with a rigid frame, a superposed frame and means for raising and lowering said superposed frame, of spring means capable of raising the superposed frame and its load during the initial movement of the aforesid raising means and adapted to be depressed in the completion of the lowering of said superposed frame.

4. A truck having a rigid frame, a superposed frame, toggle means for raising and lowering said superposed frame at both ends and springs arranged at both ends of said rigid frame and projecting thereabove adapted to be engaged by said superposed frame at a point intermediate of its movement and to be compressed by the operation of the toggle mechanism in the further lowering of the superposed frame.

5. In a truck, the combination with a rigid frame having shafts arranged with right and left hand threads at either end, cross heads threaded on said shafts, toggle members connected to said cross heads and a superposed frame mounted on said toggle members to be raised and lowered thereby, of coil compression springs mounted on the rigid frame adjacent to said toggles and adapted to be engaged and compressed in the downward movement of the toggles, and means arranged on said superposed frame adapted to engage said springs, said means having a bearing contact to support the load of the superposed frame.

6. In a truck, the combination with a rigid frame having shafts arranged with right and left hand threads at either end, cross heads threaded on said shafts, toggle members connected to said cross heads and a superposed frame mounted on said toggle members to be raised and lowered thereby, of coil compression springs mounted on the rigid frame adjacent to said toggles and adapted to be engaged and compressed in the downward movement of the toggles, cross bars extending through said superposed frame and connected with said toggle members, and bearing members mounted on said cross bars engaging the underside of the superposed frame and adapted to engage said springs.

7. In a truck, a rigid subframe having longitudinal cross head guides at each end, cross heads slidably mounted on said guides, right and left hand threaded shafts engaging said cross heads and adapted to operate them toward and from each other in pairs, toggle links connected to said cross heads, cross bars connecting the ends of said toggle links and extending across the frame, a superposed frame carried on said cross bars, said latter frame having side bars formed with slots therein at one end and enlarged orifices in the other end thereof, means for operating the threaded shaft at opposite ends of the frame independently, and means for supporting the superposed frame against lateral stress.

8. In a truck, a rigid subframe, cylindrical receptacles open at the top rigidly secured to said subframe, coil compression springs having their lower ends housed in said cylindrical receptacles and extending thereabove, a superposed frame arranged above said subframe and adapted to rest thereon, and means for raising and lowering the superposed frame adapted to engage the upwardly extending ends of said springs and to compress the same in the lowering of the superposed frame to rest upon the subframe.

9. A truck having a rigid frame provided with an offset platform at one end raised above the main portion thereof, a frame superposed upon the lower portion of the main frame, and means for raising and lowering the fore and aft ends of the superposed frame to the level of the offset platform of the rigid frame.

10. A truck, comprising a rigid subframe having centrally longitudinally arranged guides, blocks slidably and rotatably mounted on said guides, braces pivotally connected to said blocks and diverging outwardly therefrom, a superposed frame pivotally connected to the divergent ends of the braces, and means mounted on the subframe and operatively connected with the superposed frame adapted to raise and lower said superposed frame.

11. In a truck, a rigid subframe having an offset forward end extending thereabove forming a forward platform, a platform superposed upon said subframe and adapted to be raised and lowered, means for raising and lowering said superposed platform, and a ladder extending downwardly from the offset platform of the subframe giving access to the forward end of the superposed frame.

WILLIAM PLATTS KELLETT.